Patented Feb. 6, 1934

1,946,460

UNITED STATES PATENT OFFICE 1,946,460

METHOD FOR THE PRODUCTION OF PREPARATIONS SUITABLE FOR PURIFYING AIR AND LIBERATING OXYGEN

Ewald Herzog, Badisch Rheinfelden, Germany, assignor to Deutsche Gold & Silber Scheideanstalt vormals Roessler, Frankfort-on-the-Main, Germany, a corporation No Drawing. Application November 3, 1927, Serial No. 230,929, and in Germany November 10, 1926

2 Claims. (Cl. 23—6)

The purpose of this invention is to prepare alkali metal peroxide preparations for use in purifying air, especially in closed spaces and more particularly, the vitiated air of respiratory apparatus. Thus for example in a closed system, $CO_2$ in the expired air from the lungs is removed and oxygen set free in replacement of that used by respiration.

According to the German Patent No. 305,066, lower hydrates, and apparently the di-hydrates, are prepared by thoroughly mixing finely divided anhydrous peroxides with finely divided substances containing water of crystallization. When the mixture is heated, a reaction is propagated spontaneously throughout the entire mass, resulting in a redistribution of the water coming from the water of crystallization, and with the probable formation of some lower hydrates.

My investigations have now shown, that excellent oxygen preparations for breathing apparatus and the like can be obtained by a much simpler method: namely, by using alkali metal peroxides, for example sodium peroxide or mixtures of alkali metal peroxides and subjecting these to a direct treatment with a small quantity of water in such a way that the peroxide or peroxide mixture is stirred and cooled while treating it with a spray of water, or with water vapor, or even with fine crystals of ice. The quantity of water used is 6 to 7 parts, preferably not more than 9 parts, to 100 parts of peroxide. The product obtained with this amount of water, added as described above, consists of a mixture of sodium peroxide and its dihydrate. For the purpose of increasing the activity of the preparation for liberation of oxygen catalysts may be incorporated with the mass. These may be added to the alkali metal peroxide during the preparation of the latter or prior to or following the addition of the water to form the dihydrate. This may be done, for example, by adding the appropriate quantity of catalyst, such as oxygen compounds of iron, manganese, etc. or by adding the finely divided metal itself to the alkali metal or alkali metal mixture and working up this raw material into an alkali metal peroxide mixture, which is then treated with a small quantity of water to make the preparation of my invention. The proportion of catalyst to anhydrous peroxide should be about 0,2 percent.

The heat produced when the spray of water reacts should be prevented from causing a rise in temperature above approximately 0° C.

It has been shown that the preparations obtained by the present invention show exceptional activity, especially in that oxygen is given off with the first breath drawn through an apparatus containing them; $CO_2$ is readily absorbed from the start. Furthermore, a self sustaining porous mass is provided by the product manufactured according to my invention.

As an example of my invention the following is given:

*Example 1.*—50 kilograms of dry sodium peroxide were spread out in a thin layer and cooled down to —5° C. to —10° C. A fine spray of water was then directed over the surface of the peroxide which was continually stirred. After a total of 3 to 4½ parts by weight of water had been sprayed over the peroxide, while keeping the temperature below 0° C., the mass was allowed to stand for some time. 0.1 kilogram of powdered manganese dioxide was then dusted over the mass while stirring. The product was very active, absorbing $CO_2$ immediately and setting free gradually large quantities of oxygen.

*Example 2.*—A uniform and dry mixture of sodium and potassium peroxide, obtained by peroxidation of a mixture consisting of 15 kilograms of metallic potassium and 15 kilograms of metallic sodium in the presence of 0.6 kilograms $Fe_2O_3$ was stirred by rabbles in a shallow pan while 2.9 kilograms of water in the form of a very fine spray were projected over the peroxide mass. The temperature was left between minus 5 and minus 10 degrees centigrade. After one hour all the water had been sprayed into the reaction mass and the stirring was continued for a short time. The product after being kept in the cold for two weeks was very active when in contact with moisture and carbon dioxide, giving off oxygen readily.

What I claim is:

1. Method for the production of preparations suitable for purifying air and liberating oxygen in closed spaces comprising the treatment of an alkali metal peroxide with from 6 to 9 parts by weight of water in a fine state of sub-division per 100 parts of peroxide at temperatures kept at about zero degrees C.

2. Method for the production of preparations suitable for purifying air and liberating oxygen in closed spaces comprising treating an alkali metal peroxide with from 6 to 9 parts by weight of water in finely divided state per 100 parts of peroxide at temperatures kept at about zero degrees C. and in the presence of a catalyst for the liberation of oxygen in the presence of carbon dioxide and water.

EWALD HERZOG.